US008477121B2

(12) United States Patent
Nathan et al.

(10) Patent No.: US 8,477,121 B2
(45) Date of Patent: Jul. 2, 2013

(54) STABLE DRIVING SCHEME FOR ACTIVE MATRIX DISPLAYS

(75) Inventors: Arokia Nathan, Cambridge (GB); G. Reza Chaji, Waterloo (CA)

(73) Assignee: Ignis Innovation, Inc., Waterloo (CA)

( * ) Notice: Subject to any disclaimer, the term of this patent is extended or adjusted under 35 U.S.C. 154(b) by 1283 days.

(21) Appl. No.: 11/736,751

(22) Filed: Apr. 18, 2007

(65) Prior Publication Data

US 2007/0247398 A1 Oct. 25, 2007

(30) Foreign Application Priority Data

Apr. 19, 2006 (CA) ..................................... 2544090

(51) Int. Cl.
*G06F 3/038* (2006.01)
*G09G 5/00* (2006.01)

(52) U.S. Cl.
USPC .................. 345/204; 345/76; 345/82; 345/84

(58) Field of Classification Search
USPC .......... 345/76–83, 204, 84, 87–104, 208–210
See application file for complete search history.

(56) References Cited

U.S. PATENT DOCUMENTS 6,583,775 B1 6/2003 Sekiya et al.
6,594,606 B2 7/2003 Everitt
6,618,030 B2 9/2003 Kane et al.
6,677,713 B1 1/2004 Sung
6,687,266 B1 2/2004 Ma et al.
6,738,034 B2 5/2004 Kaneko et al.
7,023,408 B2 4/2006 Chen et al.
7,116,058 B2 10/2006 Lo et al.
7,315,295 B2 1/2008 Kimura
7,355,574 B1 4/2008 Leon et al.

(Continued)

FOREIGN PATENT DOCUMENTS

CA 2109951 11/1992
CA 2498136 3/2004

(Continued)

OTHER PUBLICATIONS

G. Reza Chaji, "A Stable Voltage-Programmed Pixel Circuit For a-SI:H AMOLED Displays", Dec. 2006, Journal of Display Technology, vol. 2, No. 4 pp. 347-358.

(Continued)

*Primary Examiner* — Michael Pervan
(74) *Attorney, Agent, or Firm* — Nixon Peabody LLP

(57) ABSTRACT

A method and system for operating a pixel array having at least one pixel circuit is provided. The method includes repeating an operation cycle defining a frame period for a pixel circuit, including at each frame period, programming the pixel circuit, driving the pixel circuit, and relaxing a stress effect on the pixel circuit, prior to a next frame period. The system includes a pixel array including a plurality of pixel circuits and a plurality of lines for operation of the plurality of pixel circuits. Each of the pixel circuits includes a light emitting device, a storage capacitor, and a drive circuit connected to the light emitting device and the storage capacitor. The system includes a drive for operating the plurality of lines to repeat an operation cycle having a frame period so that each of the operation cycle comprises a programming cycle, a driving cycle and a relaxing cycle for relaxing a stress on a pixel circuit, prior to a next frame period.

19 Claims, 10 Drawing Sheets

U.S. PATENT DOCUMENTS

| | | | | |
|---|---|---|---|---|
| 7,876,294 | B2 | 1/2011 | Sasaki et al. | |
| 2003/0076048 | A1 | 4/2003 | Rutherford | |
| 2004/0070557 | A1 | 4/2004 | Asano et al. | |
| 2004/0183759 | A1 | 9/2004 | Stevenson et al. | |
| 2005/0067970 | A1 | 3/2005 | Libsch et al. | |
| 2005/0206590 | A1 | 9/2005 | Sasaki et al. | |
| 2005/0269959 | A1 | 12/2005 | Uchino et al. | |
| 2006/0007072 | A1 | 1/2006 | Choi et al. | |
| 2006/0273997 | A1 | 12/2006 | Nathan et al. | |
| 2006/0284801 | A1 * | 12/2006 | Yoon et al. | 345/76 |
| 2007/0001937 | A1 | 1/2007 | Park et al. | |
| 2007/0008268 | A1 | 1/2007 | Park et al. | |
| 2007/0080906 | A1 | 4/2007 | Tanabe | |
| 2007/0103419 | A1 | 5/2007 | Uchino et al. | |
| 2007/0285359 | A1 | 12/2007 | Ono | |
| 2007/0296672 | A1 | 12/2007 | Kim et al. | |
| 2008/0042948 | A1 | 2/2008 | Yamashita et al. | |
| 2008/0074413 | A1 | 3/2008 | Ogura | |

FOREIGN PATENT DOCUMENTS

| | | | |
|---|---|---|---|
| CA | 2526782 | | 4/2006 |
| EP | 1418566 | A2 | 5/2004 |
| WO | 03/034389 | A | 4/2003 |
| WO | 2004/003877 | A | 1/2004 |
| WO | 2006/063448 | A | 6/2006 |

OTHER PUBLICATIONS

Alexander et al.: "Pixel circuits and drive schemes for glass and elastic AMOLED displays"; dated Jul. 2005 (9 pages).

Ashtiani et al.: "AMOLED Pixel Circuit With Electronic Compensation of Luminance Degradation"; dated Mar. 2007 (4 pages).

Chahi et al.: "An Enhanced and Simplified Optical Feedback Pixel Circuit for Amoled Displays"; dated Oct. 2006.

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "eUTDSP: a design study of a new VLIW-based DSP architecture"; dated May 2003 (4 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost Stable a-Si:H AMOLED Display for Portable Applications"; dated Jun. 2006 (4 pages).

Chaji et al.: "Pseudo dynamic logic (SDL): a high-speed and low-power dynamic logic family"; dated 2002 (4 pages).

Chaji et al.: "Stable a-Si:H circuits based on short-term stress stability of amorphous silicon thin film transistors"; dated May 2006 (4 pages).

European Search Report for European Application No. EP 07 71 9579 dated May 20, 2009.

International Search Report for International Application No. PCT/CA2007/000652 dated Jul. 25, 2007.

Jafarabadiashtiani et al.: "A New Driving Method for a-Si AMOLED Displays Based on Voltage Feedback"; dated 2005 (4 pages).

Matsueda y et al.: "35.1: 2.5-in. AMOLED with Integrated 6-bit Gamma Compensated Digital Data Driver"; dated May 2004.

Lee et al.: "Ambipolar Thin-Film Transistors Fabricated by PECVD Nanocrystalline Silicon"; dated 2006 (6 pages).

Nathan et al.: "Backplane Requirements for Active Matrix Organic Light Emitting Diode Displays"; dated 2006 (16 pages).

Nathan et al.: "Driving schemes for a-Si and LTPS AMOLED displays"; dated Dec. 2005 (11 pages).

Nathan et al.: "Invited Paper: a-Si for AMOLED—Meeting the Performance and Cost Demands of Display Applications (Cell Phone to HDTV)"; dated 2006 (4 pages).

Philipp: "Charge transfer sensing" Sensor Review, vol. 19, No. 2, Dec. 31, 1999, 10 pages.

Rafati et al.: "Comparison of a 17 b multiplier in Dual-rail domino and in Dual-rail D L (D L) logic styles"; dated 2002 (4 pages).

Safavaian et al.: "Three-TFT image sensor for real-time digital X-ray imaging"; dated Feb. 2, 2006 (2 pages).

Safavian et al.: "3-TFT active pixel sensor with correlated double sampling readout circuit for real-time medical x-ray imaging"; dated Jun. 2006 (4 pages).

Safavian et al.: "Self-compensated a-Si:H detector with current-mode readout circuit for digital X-ray fluoroscopy"; dated Aug. 2005 (4 pages).

Safavian et al.: "TFT active image sensor with current-mode readout circuit for digital x-ray fluoroscopy [5969D-82]"; dated Sep. 2005 (9 pages).

Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.

* cited by examiner

STABLE DRIVING SCHEME FOR ACTIVE MATRIX DISPLAYS

FIELD OF INVENTION

The present invention relates to light emitting device displays, and more specifically to a method and system for driving a pixel circuit.

BACKGROUND OF THE INVENTION

Electro-luminance displays have been developed for a wide variety of devices, such as cell phones. In particular, active-matrix organic light emitting diode (AMOLED) displays with amorphous silicon (a-Si), poly-silicon, organic, or other driving backplane have become more attractive due to advantages, such as feasible flexible displays, its low cost fabrication, high resolution, and a wide viewing angle.

An AMOLED display includes an array of rows and columns of pixels, each having an organic light emitting diode (OLED) and backplane electronics arranged in the array of rows and columns. Since the OLED is a current driven device, the pixel circuit of the AMOLED should be capable of providing an accurate and constant drive current.

However, the AMOLED displays exhibit non-uniformities in luminance on a pixel-to-pixel basis, as a result of pixel degradation, i.e., aging caused by operational use over time (e.g., threshold shift, OLED aging). Depending on the usage of the display, different pixels may have different amounts of the degradation. There may be an ever-increasing error between the required brightness of some pixels as specified by luminance data and the actual brightness of the pixels. The result is that the desired image will not show properly on the display.

Therefore, there is a need to provide a method and system that is capable of suppressing the aging of the pixel circuit.

SUMMARY OF THE INVENTION

It is an object of the invention to provide a method and system that obviates or mitigates at least one of the disadvantages of existing systems.

In accordance with an aspect of the present invention there is provided a method of operating a pixel array having at least one pixel circuit. The method includes the steps of: repeating an operation cycle defining a frame period for a pixel circuit, including at each frame period, programming the pixel circuit, driving the pixel circuit; and relaxing a stress effect on the pixel circuit, prior to a next frame period.

In accordance with another aspect of the present invention there is provided a display system. The display system includes a pixel array including a plurality of pixel circuits and a plurality of lines for operation of the plurality of pixel circuits. Each of the pixel circuits includes a light emitting device, a storage capacitor, and a drive circuit connected to the light emitting device and the storage capacitor. The display system includes a drive for operating the plurality of lines to repeat an operation cycle having a frame period so that each of the operation cycle comprises a programming cycle, a driving cycle and a relaxing cycle for relaxing a stress on a pixel circuit, prior to a next frame period.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 10(*b*) is a diagram illustrating an example of array structure having bottom emission pixels applicable to the display system of FIG. 4.

DETAILED DESCRIPTION OF THE PREFERRED EMBODIMENTS

Embodiments of the present invention are described using a pixel circuit having an organic light emitting diode (OLED) and a plurality of thin film transistors (TFTs). The pixel circuit may contain a light emitting device other than the OLED. The transistors in the pixel circuit may be n-type transistors, p-type transistors or combinations thereof. The transistors in the pixel circuit may be fabricated using amorphous silicon, nano/micro crystalline silicon, poly silicon, organic semiconductors technologies (e.g., organic TFT), NMOS/PMOS technology, CMOS technology (e.g., MOSFET) or combinations thereof. A display having the pixel circuit may be a single color, multi-color or a fully color display, and may include one or more than one electroluminescence (EL) element (e.g., organic EL). The display may be an active matrix light emitting display (e.g., AMOLED). The display may be used in DVDs, personal digital assistants (PDAs), computer displays, or cellular phones. The display may be a flat panel.

In the description below, “pixel circuit” and “pixel” are used interchangeably. In the description below, “signal” and “line” may be used interchangeably. In the description below, the terms “line” and “node” may be used interchangeably. In the description below, the terms “select line” and “address line” may be used interchangeably. In the description below, “connect (or connected)” and “couple (or coupled)” may be used interchangeably, and may be used to indicate that two or more elements are directly or indirectly in physical or electrical contact with each other.

Figure 1:
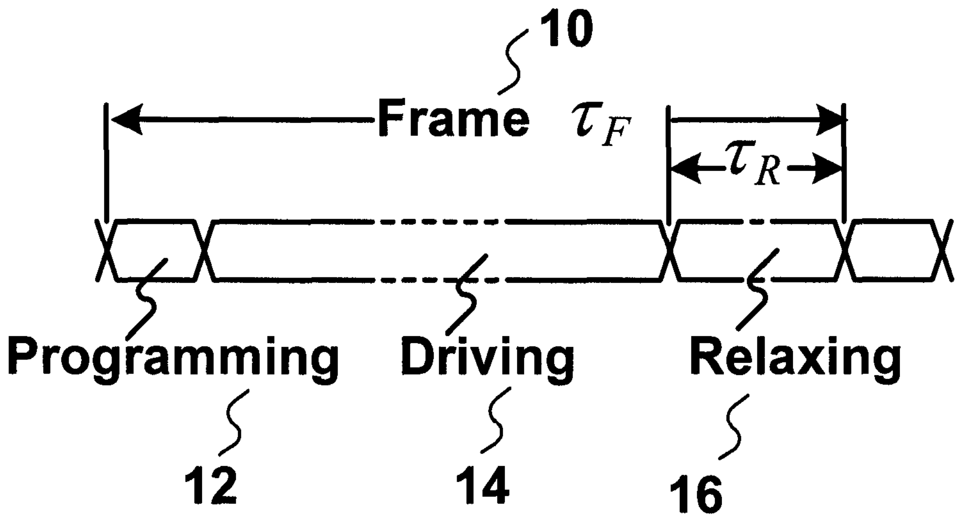
FIG. 1 is a timing chart for suppressing aging of a pixel circuit, in accordance with an embodiment of the present invention

FIG. 1 illustrates a timing schedule for suppressing aging for a pixel circuit, in accordance with an embodiment of the present invention. The pixel circuit, which is operated using the timing schedule of FIG. 1, includes a plurality of transistors and an OLED (e.g., 22, 24, 26 of FIG. 2). In FIG. 1, a frame 10 is divided into three phases: a programming cycle 12, a driving (i.e., emitting) cycle 14, and a relaxing cycle 16. The frame 10 is a time interval or period in which a display shows a frame of a video signal. During the programming cycle 12, a pixel circuit is programmed with required data to provide the wanted brightness. During the driving cycle 14, the OLED of the pixel circuit emits required brightness based on the programming data. Finally, during the relaxing cycle 16, the pixel circuit is OFF or biased with reverse polarity of the driving cycle 14. Consequently, the aging effect causes by the driving cycle 14 is annealed. This prevents aging accumulation effect from one frame to the other frame, and so the pixel life time increases significantly.

To obtain the wanted average brightness, the pixel circuit is programmed for a higher brightness since it is OFF for a fraction of frame time (i.e., relaxing cycle 16). The programming brightness based on wanted one is given by:

$$L_{CP} = \left(\frac{\tau_F}{\tau_F - \tau_R}\right) L_N \tag{1}$$

where "$L_{CP}$" is a compensating luminance, "$L_N$" is a normal luminance, "$\tau_R$" is a relaxation time (16 of FIG. 1), and "$\tau_F$" is a frame time (10 of FIG. 1).

As described below, letting the pixel circuit relax for a fraction of each frame can control the aging of the pixel, which includes the aging of driving devices (i.e., TFTs 24 and 26 of FIG. 2), the OLED (e.g., 22 of FIG. 1), or combinations thereof.

Figure 2:
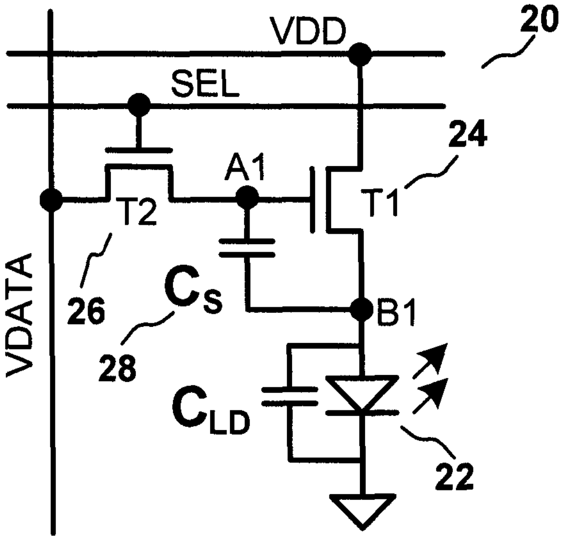
FIG. 2 is a diagram illustrating an example of a pixel circuit to which the timing schedule of FIG. 1 is suitably applied.

FIG. 2 illustrates an example of a pixel circuit to which the timing schedule of FIG. 1 is applicable. The pixel circuit 20 of FIG. 2 is a 2-TFT pixel circuit. The pixel circuit 20 includes an OLED 22, a drive TFT 24, a switch TFT 26, and a storage capacitor 28. Each of the TFTs 24 and 26 have a source terminal, a drain terminal and a gate terminal. In FIG. 2, $C_{LD}$ represents OLED capacitance. The TFTs 24 and 26 are n-type TFTs. However, it would be appreciated by one of ordinary skill in the art that the driving schemed of FIG. 1 is applicable to a complementary pixel circuit having p-type transistors or the combination of n-type and p-type transistors.

One terminal of the drive TFT 24 is connected to a power supply line VDD, and the other terminal of the drive TFT 24 is connected to one terminal of the OLED 22 (node B1). One terminal of the switch TFT 26 is connected to a data line VDATA, and the other terminal of the switch TFT 26 is connected to the gate terminal of the drive TFT 24 (node A1). The gate terminal of the switch TFT 26 is connected to a select line SEL. One terminal of the storage capacitor 28 is connected to node A1, and the other terminal of the storage capacitor 28 is connected to node B1.

Figure 3:
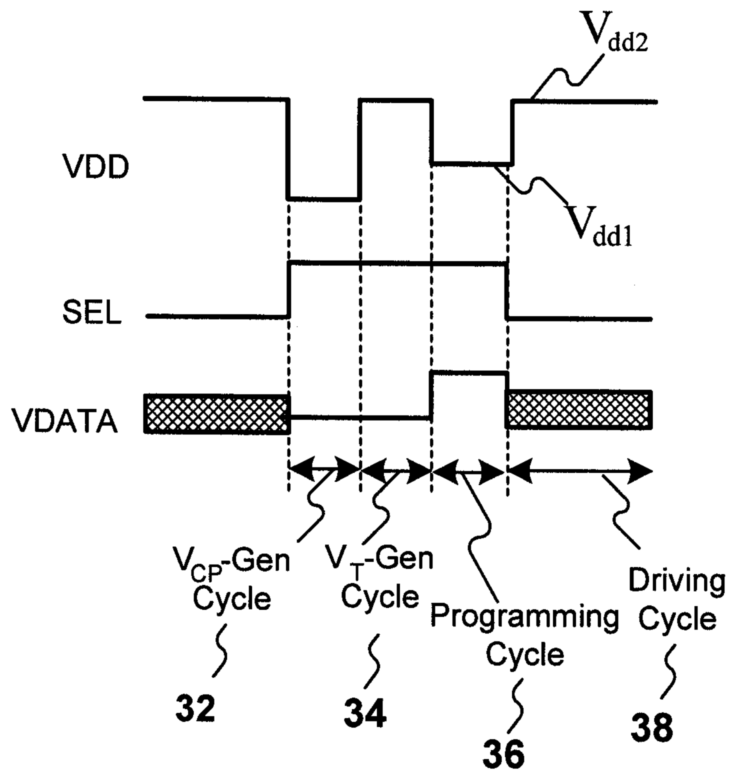
FIG. 3 is an exemplary timing chart for a compensating driving scheme in accordance with an embodiment of the present invention.

FIG. 3 illustrates an exemplary time schedule for a compensating driving scheme in accordance with an embodiment of the present invention, which is applicable to the pixel of FIG. 2. In FIG. 3, "32" represents "$V_{CP}$-Gen cycle", "34" represents "$V_T$-Gen cycle", "36" represents "programming cycle" and associated with the programming cycle 12 of FIG. 1, and "38" represents "driving cycle" and associated with the driving cycle 14 of FIG. 1.

The waveforms of FIG. 3 are used, for example, in the cycles 12 and 14 of FIG. 1. During the $V_{CP}$-Gen cycle 32, a voltage is developed across the gate-source voltage of a drive TFT (e.g., 24 of FIG. 2). During the $V_T$-Gen cycle 34, voltage at node B1 becomes $-V_T$ of the drive TFT (e.g., 24 of FIG. 2) where $V_T$ is the threshold voltage of the drive TFT (e.g., 24 of FIG. 2). During the programming cycle 36, node A1 is charged to $V_P$ which is related to Lcp of (1).

Referring to FIGS. 2 and 3, during the first operating cycle 32 ("$V_{CP}$-Gen"), VDD changes to a negative voltage ($-V_{CPB}$) while VDATA has a positive voltage ($V_{CPA}$). Thus, node A1 is charged to $V_{CPA}$, and node B1 is discharged to $-V_{CPB}$. $V_{CPA}$ is smaller than $V_{TO}+V_{OLEDO}$, where the $V_{TO}$ is the threshold voltage of the unstressed drive TFT 24 and the $V_{OLEDO}$ is the ON voltage of the unstressed OLED 22.

During the second operating cycle 34 ("$V_T$-Gen"), VDD changes to $V_{dd2}$ that is a voltage during the driving cycle 38. As a result, node B1 is charged to the point at which the drive TFT 24 turns off. At this point, the voltage at node B1 is ($V_{CPA}-V_T$) where $V_T$ is the threshold of the drive TFT 24, and the voltage stored in the storage capacitor 28 is the $V_T$ of the drive TFT 24.

During the third operating cycle 36 ("programming cycle"), VDATA changes to a programming voltage, $V_{CPA}+V_P$. VDD goes to Vdd1 which is a positive voltage. Assuming that the OLED capacitance ($C_{LD}$) is large, the voltage at node B1 remains at $V_{CPA}-V_T$. Therefore, the gate-source voltage of the drive TFT 24 ideally becomes $V_P+V_T$. Consequently, the pixel current becomes independent of ($\Delta V_T+\Delta V_{OLED}$) where $\Delta V_T$ is a shift of the threshold voltage of the drive TFT 24 and $\Delta V_{OLED}$ is a shift of the ON voltage of the OLED 22.

Figure 4:
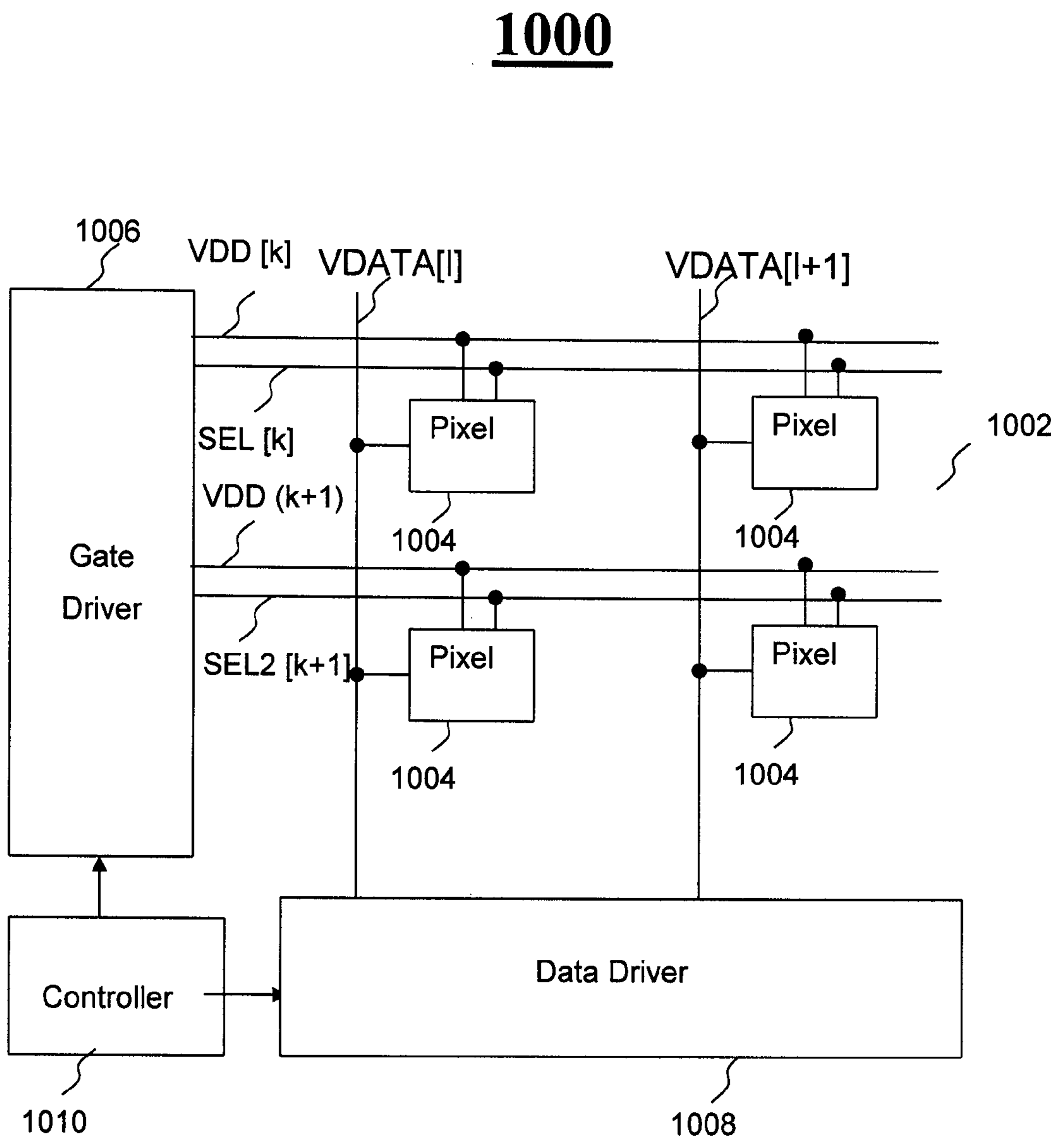
FIG. 4 is a diagram illustrating an example of a display system for implementing the timing schedule of FIG. 1 and the compensating driving scheme of FIG. 3.

FIG. 4 illustrates an example of a display system for implementing the timing schedule of FIG. 1 and the compensating driving scheme of FIG. 3. The display system 1000 includes a pixel array 1002 having a plurality of pixels 1004. The pixel 1004 corresponds to the pixel 20 of FIG. 2. However, the pixel 1004 may have structure different from that of the pixel 20. The pixels 1004 are arranged in row and column. In FIG. 4, the pixels 1004 are arranged in two rows and two columns. The number of the pixels 1004 may vary in dependence upon the system design, and does not limited to four. The pixel array 1002 is an active matrix light emitting display, and may form an AMOLED display.

"SEL[i]" is an address line for the ith row (i= . . . k, k+1 . . . ) and corresponds to SEL of FIG. 2. "VDD[i]" is a power supply line for the ith row (i= . . . k, k+1 . . . ) and corresponds to VDD of FIG. 2. "VDATAU[j]" is a data line for the jth row (i= . . . 1, 1+1 . . . ) and corresponds to VDATA of FIG. 2.

A gate driver 1006 drives SEL[i] and VDD[i]. The gate driver 1006 includes an address driver for providing address signals to SEL[i]. A data driver 1008 generates a programming data and drives VDATAU[j]. The controller 1010 controls the drivers 1006 and 1008 to drive the pixels 1004 based on the timing schedule of FIG. 1 and the compensating driving scheme of FIG. 3.

Figure 5:
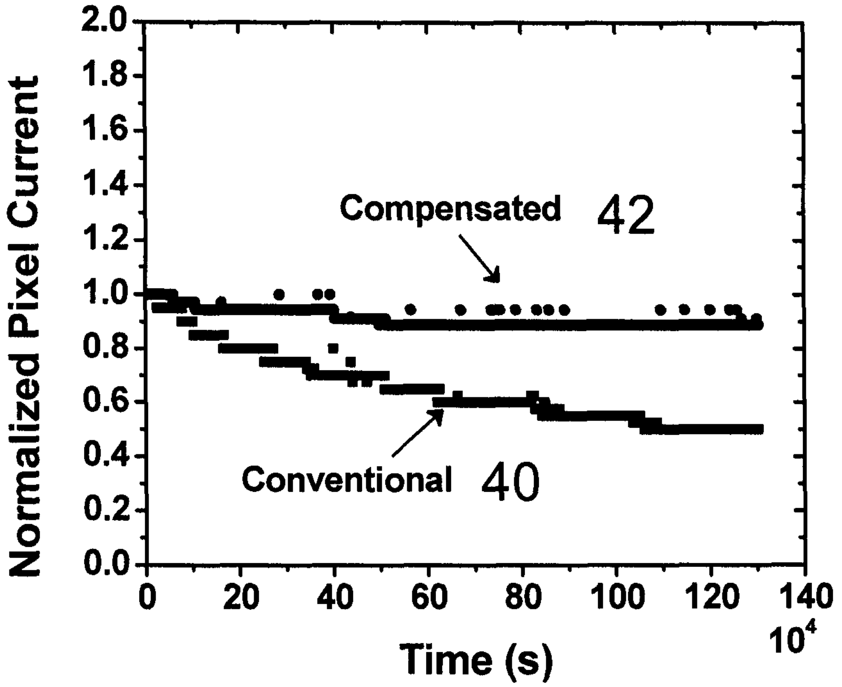
FIG. 5 is a graph illustrating measurement results for a conventional driving scheme and the compensating driving scheme of FIG. 3.

FIG. 5 illustrates lifetime results for a conventional driving scheme and the compensating driving scheme. Pixel circuits of FIG. 2 are programmed for 2 μA at a frame rate of ~60 Hz by using the conventional driving scheme (40) and the compensating driving scheme (42). The compensating driving scheme (42) is highly stable, reducing the total aging error to less than 10%. By contrast, in the conventional driving scheme (40), while the pixel current becomes half of its initial value after 36 hours, the aging effects result in a 50% error in the pixel current over the measurement period. The total shift in the OLED voltage and threshold voltage of the drive TFT (i.e., 24 of FIG. 2), $\Delta(V_{OLED}+V_T)$, is ~4 V.

Figure 6:
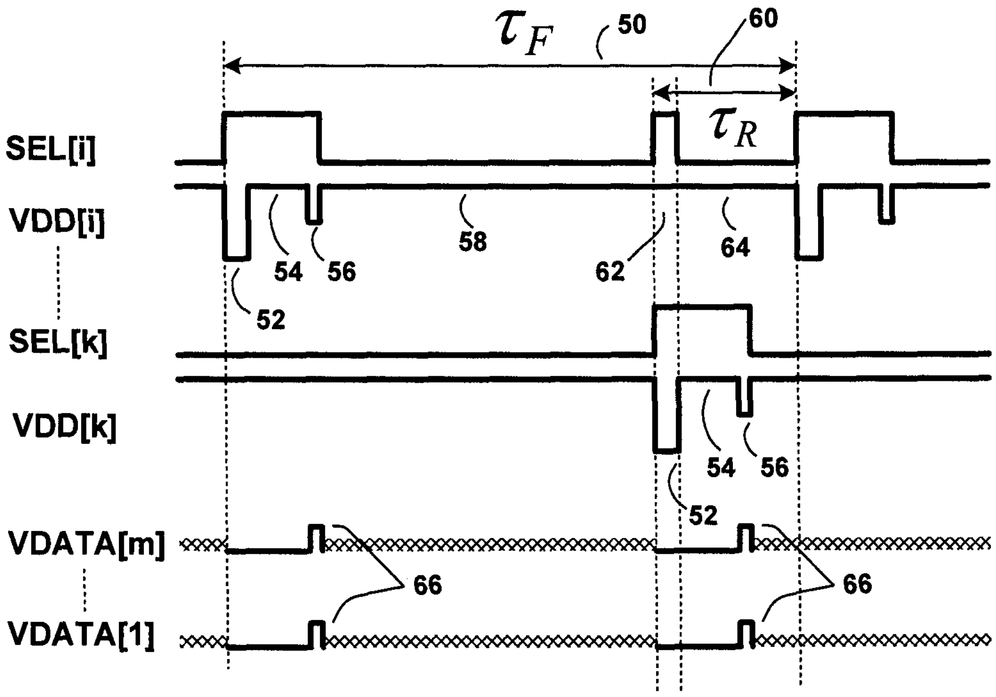
FIG. 6 is a timing chart illustrating an example of frames based on the timing schedule of FIG. 1 and the compensating driving scheme of FIG. 3.

FIG. 6 illustrates an example of frames using the timing schedule of FIG. 1 and the compensating driving scheme of FIG. 3.

In FIG. 6, "i" represents the ith row in a pixel array, "k" represents the kth row in the pixel array, "m" represents the mth column in the pixel array, and "1" represents the 1th column in the pixel array. The waveforms of FIG. 6 are applicable to the display system 1000 of FIG. 4 to operate the pixel array 1002 of FIG. 4. It is assumed that the pixel array includes more than one pixel circuit 20 of FIG. 2.

In FIG. 6, "50" represents a frame for the ith row and corresponds to "10" of FIG. 1, "52" represents "$V_{CP}$-Gen cycle" and corresponds to "32" of FIG. 3, "54" represents "$V_T$-Gen cycle" and corresponds to "34" of FIG. 3, and "56" represents "programming cycle" and corresponds to "36" of FIG. 3. In FIG. 6, "58" represents "driving cycle" and corresponds to "38" of FIG. 3. In FIG. 6, "66" represents the values of the corresponding VDATA lines during the operating cycle 56.

In FIG. 6, "60" represents a relaxing cycle for the ith row and corresponds to "16" of FIG. 1. The relaxing cycle 60 includes a first operating cycle "62" and a second operating cycle "64". During the relaxing cycle 60 for the ith row, SEL[i] is high at the first operating cycle 62 and then is low at the second operating cycle 64. During the frame cycle 62, node A1 of each pixel at the ith row is charged to a certain voltage, such as, zero. Thus, the pixels are OFF during the frame cycle 64. "$V_{CP}$-Gen cycle" 52 for the kth row occurs at the same timing of the first operating cycle 62 for the ith row.

During the first operating cycle 52 for the kth row, which is the same as the first operating cycle 62 for the ith row, SEL[i] is high, and so the storage capacitors of the pixel circuits at the ith row are charged to $V_{CPA}$. VDATA lines have $V_{CPA}$. Considering that $V_{CPA}$ is smaller than $V_{OLED0}+V_{T0}$, the pixel circuits at the ith row are OFF at the second operating cycle 64 and also the corresponding drive TFTs (24 of FIG. 2) are negatively biased resulting in partial annealing of the $V_T$–shift at the cycle 64.

Figure 7:
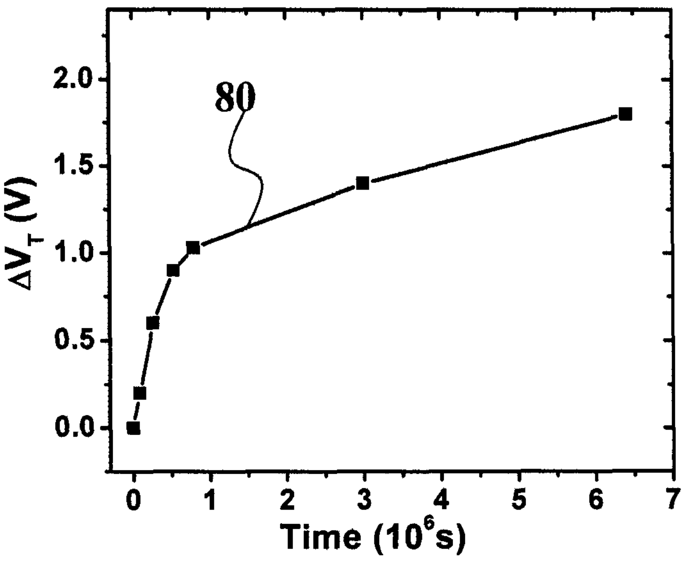
FIG. 7 is a graph illustrating the measurement result of threshold voltage shift based on the compensating driving scheme of FIG. 6.
Figure 8:
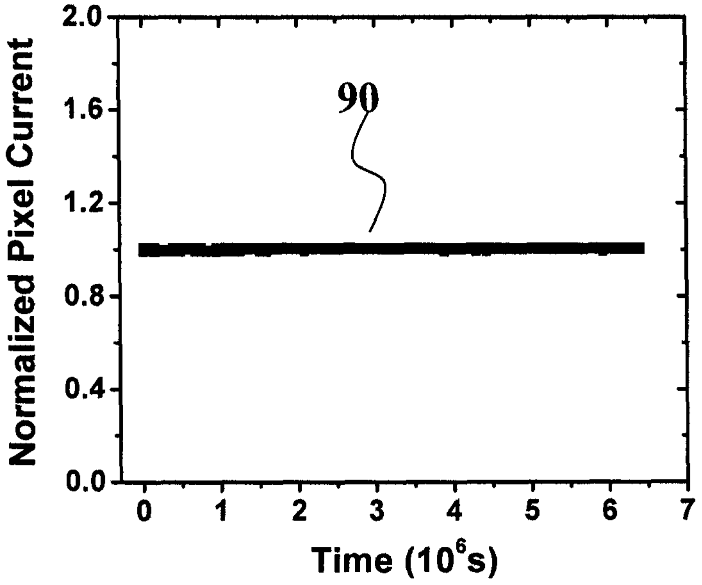
FIG. 8 is a graph illustrating the measurement result of OLED current based on the compensating driving scheme of FIG. 6.

FIGS. 7 and 8 illustrate results of a longer lifetime test for a pixel circuit employing the timing cycles of FIG. 6. To obtain data of FIGS. 7 and 8, a pixel array having more than one pixel 20 of FIG. 2 was used.

In FIG. 7, "80" represents the measurement result of the shift in the threshold voltage of the drive transistor (i.e., 24 of FIG. 2). The result signifies that the above method and results in a highly stable pixel current even after 90 days of operation. Here, the pixel of FIG. 2 is programmed for 2.5 μA to compensate for the luminance lost during the relaxing cycle. The $\Delta(V_{OLED}+V_T)$ is extracted once after a long timing interval (few days) to not disturb pixel operation. It is clear that the OLED current is significantly stable after 1500 hours of operation which is the results of suppression in the aging of the drive TFT (i.e., 24 of FIG. 2) as shown in FIG. 7.

In FIG. 8, "90" represents the measurement result of OLED current of the pixel (i.e., 20 of FIG. 2) over time. The result depicted in FIG. 8 confirms that the enhanced timing diagram suppresses aging significantly, resulting in longer lifetime. Here, $\Delta(V_{OLED}+V_T)$ is 1.8 V after a 90 days of operation, whereas it is 3.6 V for the compensating driving scheme without the relaxing cycle after a shorter time.

Figure 9:
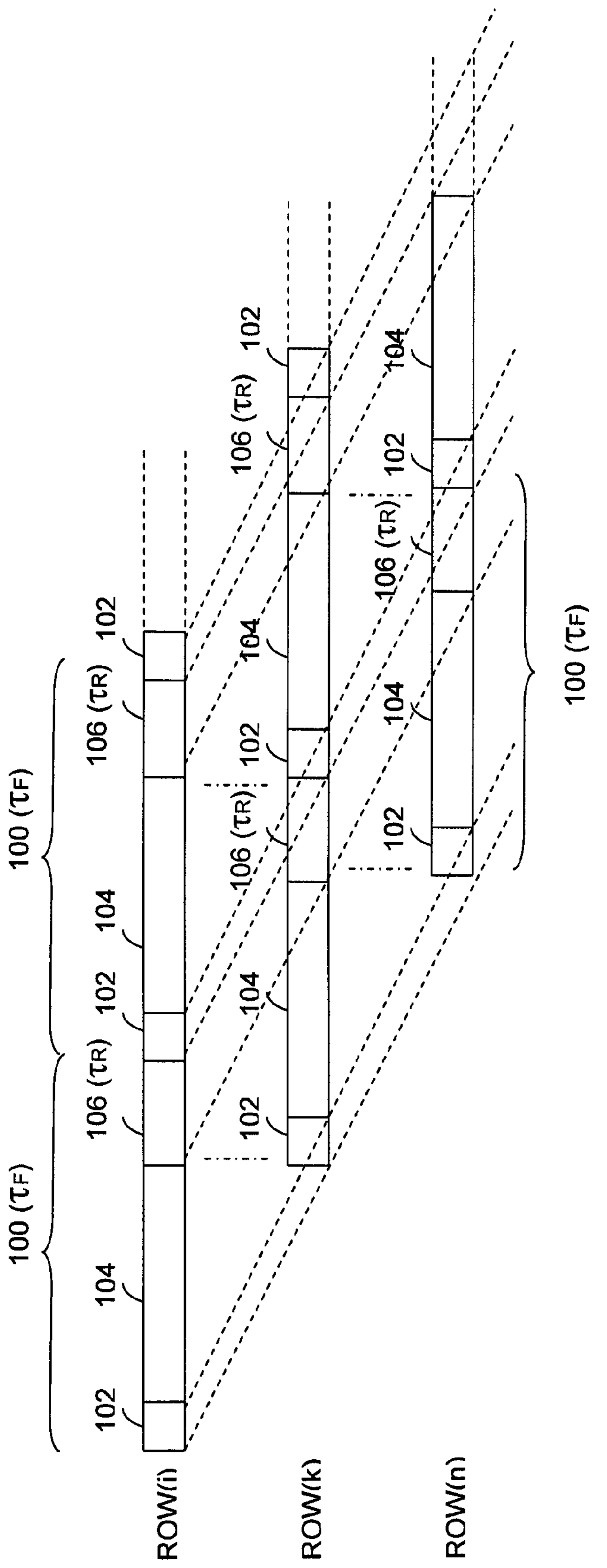
FIG. 9 is a diagram illustrating an example of a driving scheme applied to a pixel array, in accordance with an embodiment of the present invention.

FIG. 9 is a diagram illustrating an example of the driving scheme applied to a pixel array, in accordance with an embodiment of the present invention. In FIG. 9, each of ROW (i), ROW(k) and ROW (n) represents a row of the pixel array. The pixel array may be the pixel array 1002 of FIG. 4. The frame 100 of FIG. 9 includes a programming cycle 102, a driving cycle 104, and a relaxing cycle 106, and has a frame time "$\tau_F$". The programming cycle 102, the driving cycle 104, and the relaxing cycle 106 may correspond to the operation cycles 12, 14, and 16 of FIG. 1, respectively. The programming cycle 102 may include the operating cycles 32, 34 and 36 of FIG. 3. The relaxing cycle 106 may be similar to the relaxing cycle 60 of FIG. 6.

The programming cycle 102 for the kth row occurs at the same timing of the relaxing cycle 106 for the ith row. The programming cycle 102 for the nth row occurs at the same timing of the relaxing cycle 106 for the kth row.

Figure 10A:
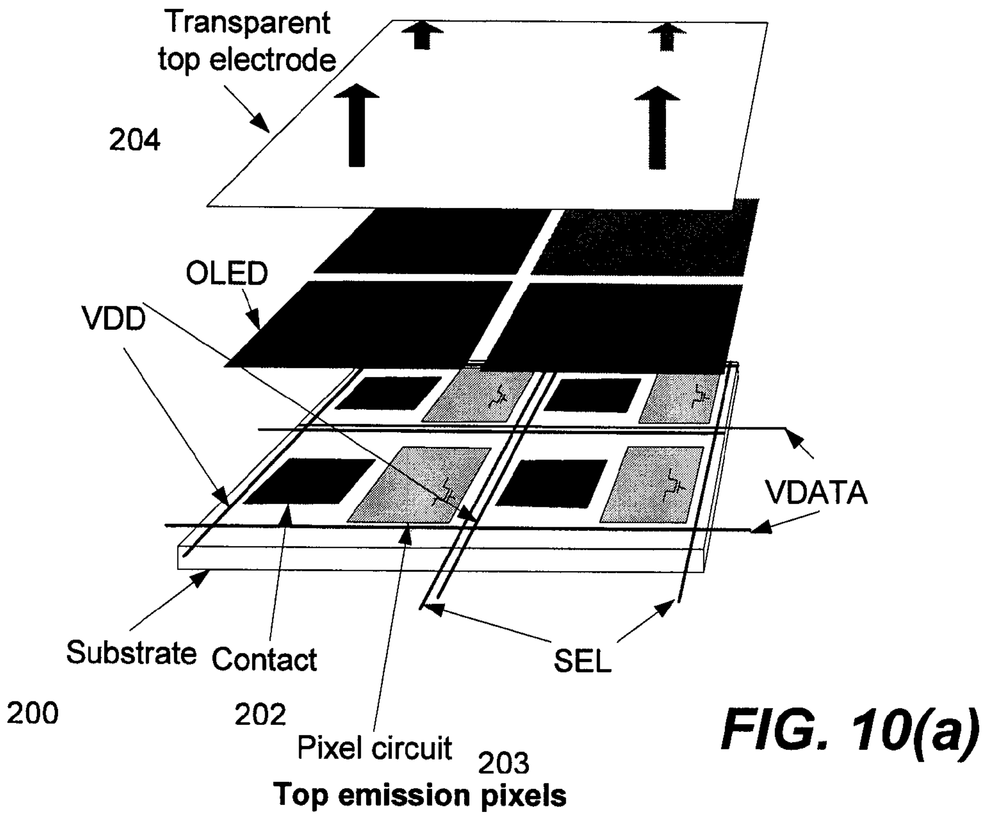
FIG. 10(*a*) is a diagram illustrating an example of array structure having top emission pixels applicable to the display system of FIG. 4.
Figure 10B:
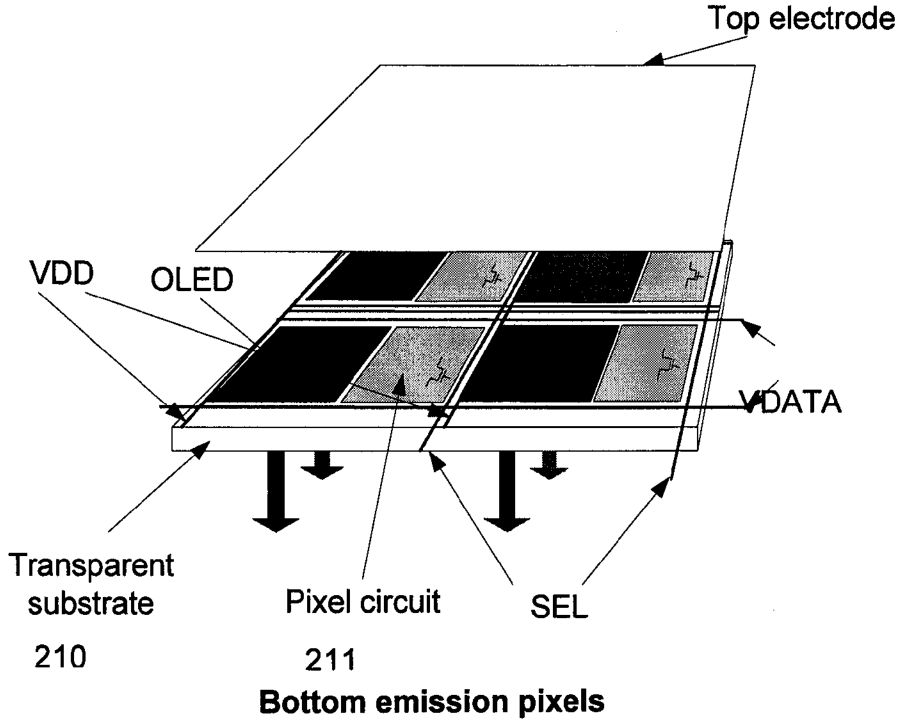

FIG. 10(*a*) illustrates an example of array structure having top emission pixels. FIG. 10(*b*) illustrates an example of array structure having bottom emission pixels. The pixel array of FIG. 4 may have the array structure of FIG. 10(*a*) or 10(*b*). In FIG. 10(*a*), 200 represents a substrate, 202 represents a pixel contact, 203 represents a (top emission) pixel circuit, and 204 represents a transparent top electrode on the OLEDs. In FIG. 10(*b*), 210 represents a transparent substrate, 211 represents a (bottom emission) pixel circuit, and 212 represents a top electrode. All of the pixel circuits including the TFTs, the storage capacitor, the SEL, VDATA, and VDD lines are fabricated together. After that, the OLEDs are fabricated for all pixel circuits. The OLED is connected to the corresponding driving transistor using a via (e.g., B1 of FIG. 2) as shown in FIGS. 10(*a*) and 10(*b*). The panel is finished by deposition of the top electrode on the OLEDs which can be a continuous layer, reducing the complexity of the design and can be used to turn the entire display ON/OFF or control the brightness.

In the above description, the pixel circuit 20 of FIG. 2 is used as an example of a pixel circuit for implementing the timing schedule of FIG. 1, the compensating driving schedule of FIG. 3, and the timing schedule of FIG. 6. However, it is appreciated that the above timing schedules of FIGS. 1, 3 and 6 are applicable to pixel circuits other than that of FIG. 2, despite its configuration and type.

Examples of the driving scheme, compensating and driving scheme, and pixel/pixel arrays are described in G. R. Chaji and A. Nathan, "Stable voltage-programmed pixel circuit for AMOLED displays," IEEE J. of Display Technology, vol. 2, no. 4, pp. 347-358, December 2006, which is hereby incorporated by reference.

One or more currently preferred embodiments have been described by way of example. It will be apparent to persons skilled in the art that a number of variations and modifications can be made without departing from the scope of the invention as defined in the claims.

What is claimed is:

1. A method of operating a pixel array having at least one pixel circuit, the pixel circuit including a switch, a select line connected to the switch, a drive transistor coupled to a data line via the switch and to a power supply line, a light emitting device coupled to the drive transistor, and a storage capacitor coupled to the drive transistor, the method comprising:

repeating an operation cycle defining a frame period for a pixel circuit, including at each frame period:

programming during the operation cycle the pixel circuit responsive to driving the select line from a first state to a second state to select the pixel for programming, the programming including providing a programming data on the data line;

responsive to the programming, driving the pixel circuit during a driving cycle of the operation cycle responsive to driving the select line from the second state to the first state; and responsive to the driving, relaxing a stress effect on the pixel circuit during a relaxing cycle of the operation cycle, prior to a next frame period, the relaxing including driving the select line from the first state to the second state during a first operating cycle of the relaxing cycle followed by driving the select line from the second state to the first state during a second operating cycle of the relaxing cycle so that the pixel circuit is off during said the second operating cycle, the relaxing further including, during the first operating cycle, changing the data line to a voltage smaller than $V_{T0}+V_{OLED0}$, where $V_{TO}$ is a threshold voltage of the drive transistor in an unstressed state and $V_{OLED0}$ is an ON voltage of the light emitting device in an unstressed state, wherein the pixel circuit is off at the second operating cycle, and wherein the power supply line has a positive voltage during the driving driving cycle and the relaxing cycle.

2. A method as claimed in claim 1, wherein the relaxing comprises: turning the pixel circuit off.

3. A method as claimed in claim 1, wherein the relaxing comprises: biasing the pixel circuit with a reverse polarity relative to a polarity of the pixel circuit during the driving.

4. A method as claimed in claim 1, wherein the programming comprises:

at a first cycle, developing a voltage across the gate-source voltage of the drive transistor.

5. A method as claimed in claim 4, wherein the developing comprises:

charging the power supply line to a first voltage and charging the data line to a second voltage with a reverse polarity of the first voltage.

6. A method as claimed in claim 5 wherein the drive transistor has a gate terminal and first and second terminals, the gate terminal being connected to the data line via the switch, and wherein the first terminal of the drive transistor is connected to the power supply line and the second terminal of the drive transistor is connected to the light emitting device, a first terminal of the storage capacitor being connected to the gate terminal of the drive transistor, a second terminal of the storage capacitor being connected to the second terminal of the drive transistor and the light emitting device.

7. A method as claimed in claim 4, wherein the programming comprises:

at a second cycle subsequent to the first cycle, operating on the pixel circuit so that a voltage of a connection point between the light emitting device and the drive transistor and the storage capacitor is the second voltage of the data line minus a threshold voltage of the drive transistor.

8. A method as claimed in claim 7 wherein the programming comprises:

at a third cycle subsequent to the second cycle, charging the data line to a programming voltage associated with a programming data.

9. A method as claimed in claim 4, wherein the programming comprises:

at a second cycle subsequent to the first cycle, operating on the pixel circuit so that a voltage stored in the storage capacitor is a threshold voltage of the drive transistor.

10. A method as claimed in claim 9 wherein the programming comprises:

at a third cycle subsequent to the second cycle, programming the pixel circuit by a voltage defined by:

$$L_{CP} = \left(\frac{\tau_F}{\tau_F - \tau_R}\right) L_N$$

where "$L_{CP}$" is a compensating luminance, "$L_N$" is a normal luminance, "$\tau_R$" is a relaxation time at the relaxing, and "$\tau_F$" is the frame period.

11. A method as claimed in claim 4 wherein the programming comprises:

at a second cycle subsequent to the first cycle, charging the power supply line to a third voltage, the third voltage being identical to a voltage for driving the pixel circuit.

12. A method as claimed in claim 4 wherein the programming comprises:

at a second cycle subsequent to the first cycle, charging one of the first and second terminals of the drive transistor to a point at which the drive transistor turns off.

13. The method as claimed in claim 1, wherein the programming includes:

at a first cycle of the programming cycle, charging the power supply line to a first voltage having a reverse polarity of the voltage on the data line;

at a second cycle of the programming cycle subsequent to the first cycle, changing the voltage of the power supply line to a point at which the drive transistor turns off; and at a third cycle of the programming cycle subsequent to the second cycle, providing the programming data on the data line by charging the data line to a programming voltage corresponding to the programming data.

14. The method as claimed in claim 1, wherein the relaxing includes:

during the second operating cycle of the relaxing, simultaneously programming a second pixel located in a row in the pixel array different from the row in which the first pixel is located by providing a second programming data for the second pixel on the data line responsive to driving a second select line from the first state to the second state.

15. A display system comprising:

a pixel array including a plurality of pixel circuits and a plurality of lines for operation of the plurality of pixel circuits, each of the pixel circuits having a switch, a select line connected to the switch, a light emitting device, a storage capacitor, and a drive transistor connected to the light emitting device and the storage capacitor, the drive transistor being connected to a data line via the switch and to a power supply line;

a driver for operating the plurality of lines to repeat an operation cycle having a frame period so that each of the operation cycle comprises a programming cycle, a driving cycle and a relaxing cycle for relaxing a stress on a pixel circuit of the pixel array, prior to a next frame period; and a controller coupled to the driver, the controller operable to:

program during the programming cycle a first of the pixel circuits responsive to driving the select line from a first state to a second state to select the first pixel circuit for programming by providing a programming data on the data line, responsive to programming the first pixel circuit, drive the first pixel circuit during the driving cycle responsive to driving the select line from the second state to the first state, and responsive to driving the first pixel circuit, relax a stress effect on the first pixel circuit during the relaxing cycle, prior to the next frame period, by driving the select line from the first state to the second state during a first operating cycle of the relaxing cycle followed by driving the select line from the second state to the first state during a second operating cycle of the relaxing cycle so that the pixel circuit is off during the second operating cycle, wherein during the first operating cycle, the data line is changed to a voltage smaller than $V_{T0}+V_{OLED0}$, where $V_{TO}$ is a threshold voltage of the drive transistor in an unstressed state and $V_{OLED0}$ is an ON voltage of the light emitting device in an unstressed state, wherein the first pixel circuit is off at the second operating cycle, and wherein the power supply line has a positive voltage during the driving cycle and the relaxing cycle.

16. A display system as claimed in claim 15, wherein the light emitting device is an organic light emitting diode.

17. A display system as claimed in claim 15, wherein the plurality of transistors are fabricated using fabricated using amorphous silicon, nano/micro crystalline silicon, poly silicon, organic semiconductors technology, NMOS/PMOS technology, CMOS technology, or combinations thereof.

18. A display system as claimed in claim 15 further comprising a controller for controlling the driver so that the programming cycle for a first row of the first pixel circuit occurs simultaneously during the second operating cycle of the relaxing cycle for a second pixel circuit in a second row.

19. The display system as claimed in claim 15, wherein the controller is further operable to:

at a first cycle of the programming cycle, charging the power supply line to a first voltage having a reverse polarity of the voltage on the data line;

at a second cycle of the programming cycle subsequent to the first cycle, changing the voltage of the power supply line to a point at which the drive transistor turns off; and at a third cycle of the programming cycle subsequent to the second cycle, providing the programming data on the data line by charging the data line to a programming voltage corresponding to the programming data.

* * * * *